United States Patent [19]

Herbert

[11] 4,296,940
[45] Oct. 27, 1981

[54] FOLDING BICYCLE

[76] Inventor: Hugh G. Herbert, 1<sup>B</sup> Limpsfield Ave., London SW19 6DL, England

[21] Appl. No.: 38,732

[22] Filed: May 14, 1979

[30] Foreign Application Priority Data

May 22, 1978 [GB] United Kingdom ............... 21056/78

[51] Int. Cl.³ ............................................. B62K 15/00
[52] U.S. Cl. ..................................... 280/278; 280/287
[58] Field of Search ................................ 280/287, 278

[56] References Cited

U.S. PATENT DOCUMENTS 2,482,472  9/1949  Fried .............................. 280/287 X

FOREIGN PATENT DOCUMENTS 2651305  5/1978  Fed. Rep. of Germany ...... 280/287
39850    8/1936  Netherlands ........................ 280/287
61241    1/1948  Netherlands ........................ 280/287
526773   9/1940  United Kingdom ................ 280/287

Primary Examiner—Leslie J. Paperner
Assistant Examiner—Terrance L. Siemens
Attorney, Agent, or Firm—Sherman & Shalloway

[57] ABSTRACT

A folding bicycle comprises a frame, a front wheel and handlebars at the front end of the frame, a chain-driven rear wheel at the rear end of the frame, and a saddle carried at an intermediate part of the frame. The frame comprises a base formed as generally-aligned end-to-end tie members pivotally connected at their adjacent ends to a bearing unit, an apex joint bracket which is connected to the remote ends of the tie members by pivotal front strut members and a rigid rear strut member, and a support member which extends from the bearing unit and through the apex joint bracket and carries said saddle. The frame is collapsible on raising the support member to move the bearing unit towards the apex joint bracket and so swing the front and rear wheels downwardly into positions alongside one another.

12 Claims, 14 Drawing Figures

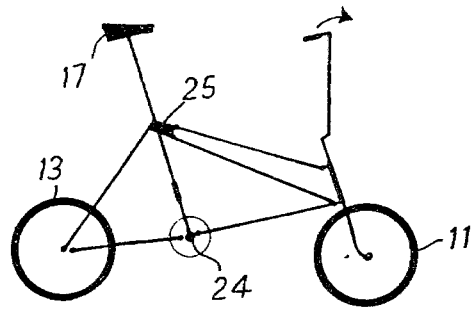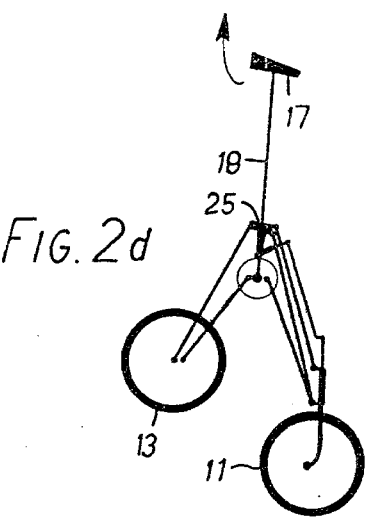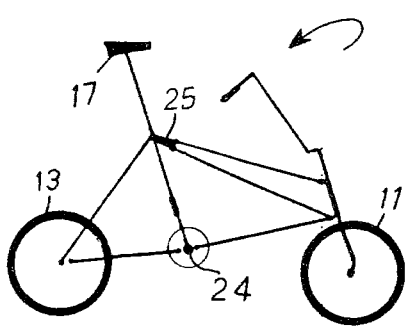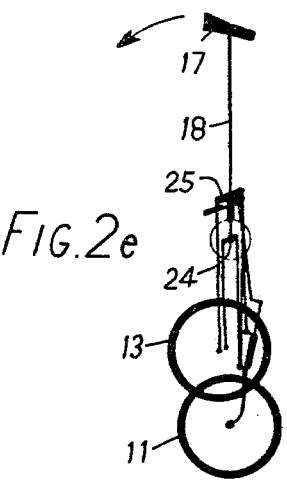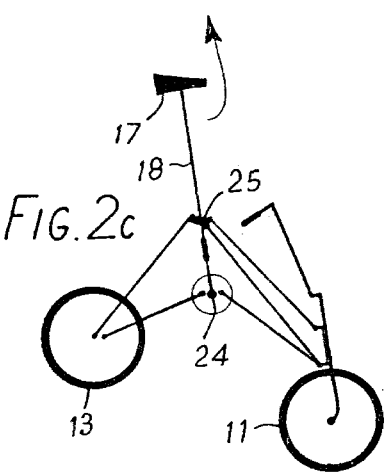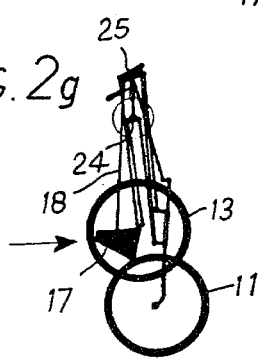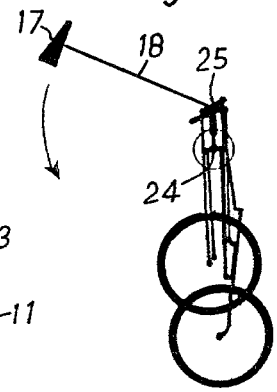

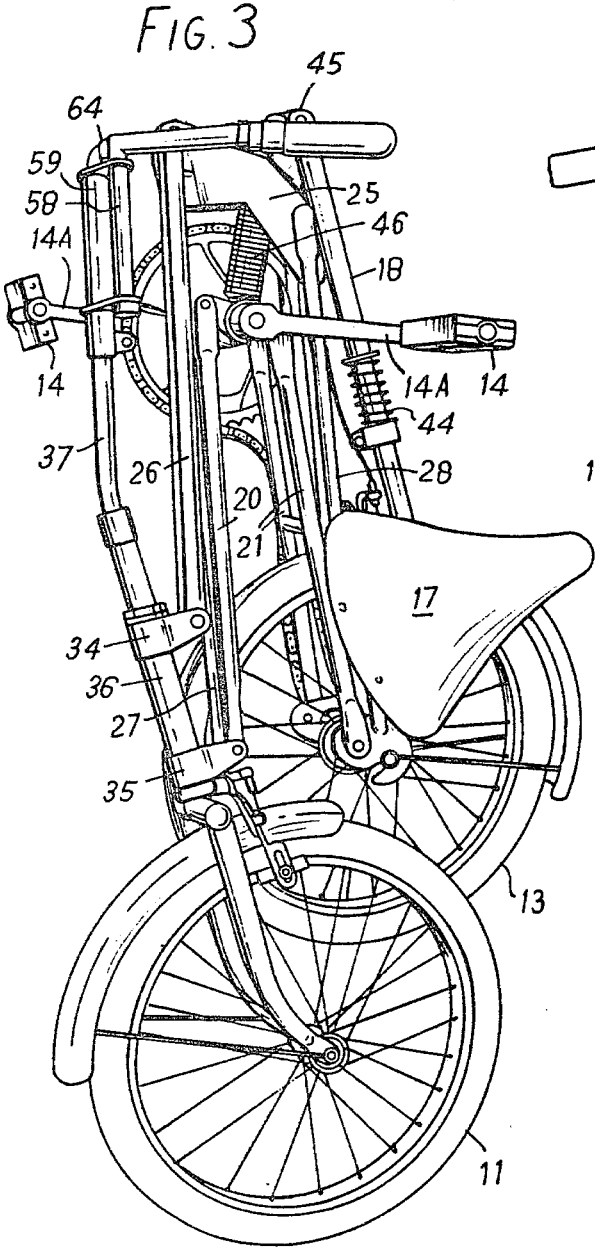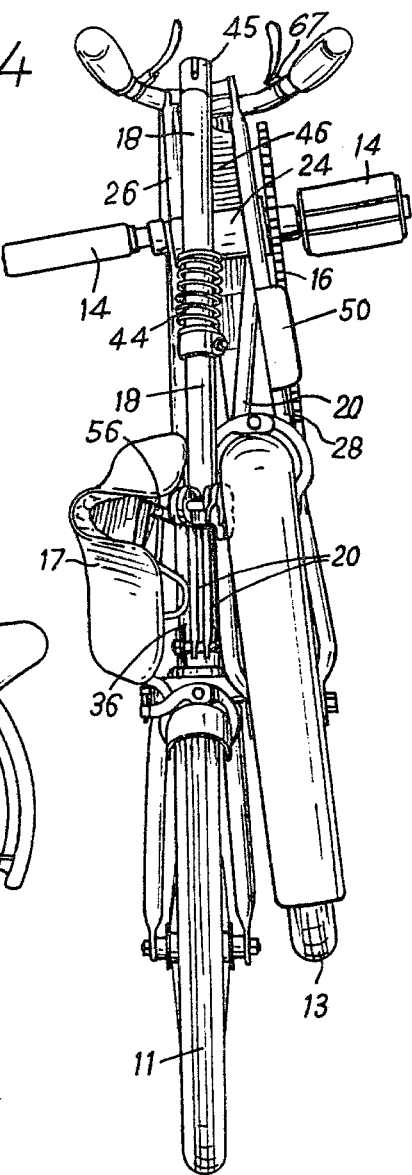

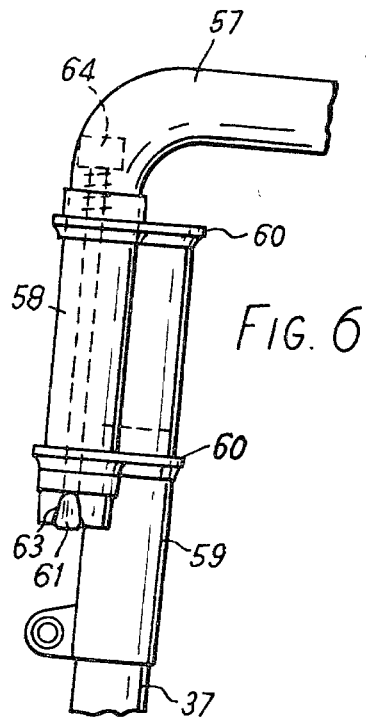
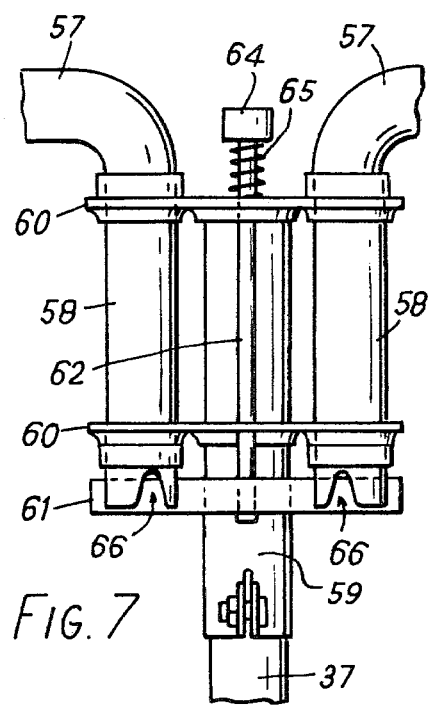
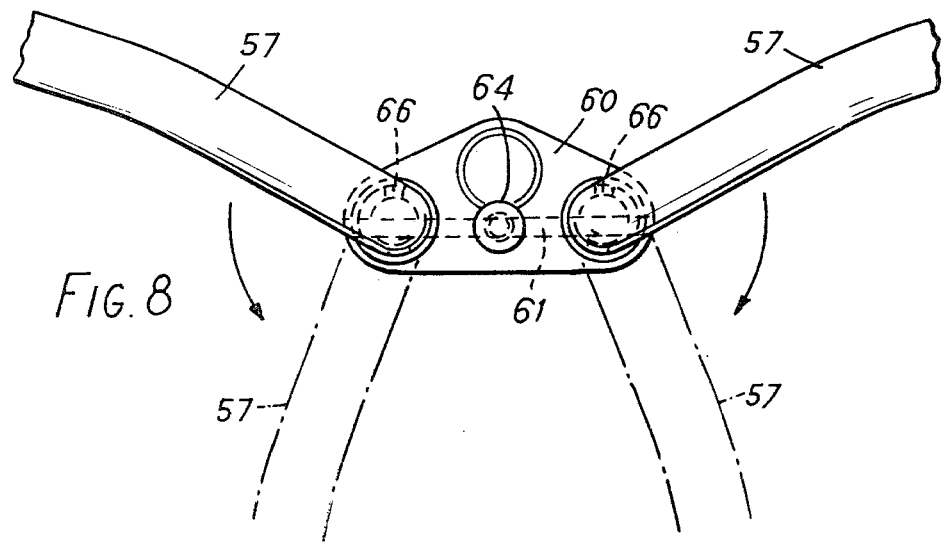

FOLDING BICYCLE

BACKGROUND OF THE INVENTION

This invention relates to folding bicycles.

Folding bicycles are, of course, well-known, the usual kind having a frame which (in the upright or in-use position) hinges about a more-or-less vertical axis so that the ground wheels are swung towards one another in generally horizontal arcs. Bicycles of this kind may be quite satisfactory, but some are cumbersome to collapse and re-erect and most involve disadvantages such as the necessity to lock and unlock the frame parts and other components such as the seat column.

It is an object of the present invention to provide a folding bicycle which has a frame that folds in a novel manner and which can be collapsed and re-erected quickly and particularly simply without necessarily unfastening any frame parts.

SUMMARY OF THE INVENTION

According to the present invention there is provided a folding bicycle comprising a frame, a front wheel and handle-bars at the front end of the frame, a rear wheel at the rear end of the frame, and a saddle carried at an intermediate part of the frame, characterised in that said frame comprises a base formed as generally-aligned end-to-end tie members pivotally connected at their adjacent ends to a bearing unit, an apex joint connected to the remote ends of the tie members by strut members, and a support member which extends from the bearing unit and through the apex joint and carries said saddle, said frame being collapsible on raising said support member to move said bearing unit towards said apex joint and so swing the front and rear wheels downwardly into positions alongside one another.

Suitably, selected pivotal axes of said tie and strut members are canted so that said wheels swing closely alongside one another in the folded position of the bicycle.

Preferably, said support member incorporates a hinge, so that, when fully raised, a major length of the support member can be swung downwardly to position said saddle adjacent said wheels.

BRIEF DESCRIPTION OF THE DRAWINGS

FIGS. 2a to 2g are diagrammatic side views illustrating the steps involved in folding the bicycle;

FIGS. 3 and 4 are side and front views showing the bicycle in the folded position;

FIGS. 6, 7 and 8 are detail side, front and plan views showing the handlebar hinge joints.

DESCRIPTION OF A PREFERRED EMBODIMENT

Figure 1:
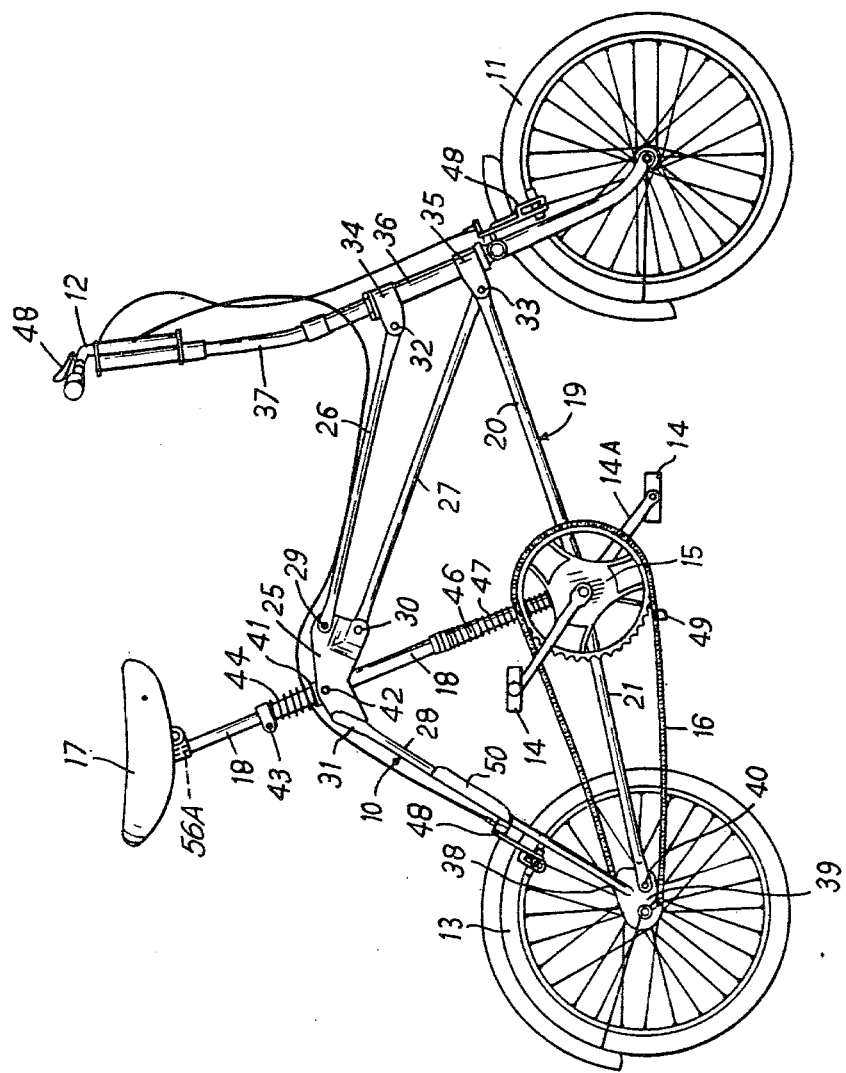
FIG. 1 is a side view showing a folding bicycle, according to the invention, in the erect or in-use position.

Referring to FIG. 1 of the drawings, the folding bicycle comprises a frame 10, a front wheel 11 controlled by handlebars 12, a rear wheel 13 driven by means of pedals 14 through a chain wheel 15 and chain 16 (or alternatively a belt), and a saddle 17 supported on a column 18.

The frame 10 has a base 19 which comprises tie members 20 and 21 pivotally connected at their adjacent ends 22, 23 (FIG. 5) to a bearing unit 24. The frame also has an apex joint bracket 25 to which struts 26, 27 and 28 are attached; the front struts 26, 27 are pivotally connected at their upper ends 29, 30 and the rear strut 28 is rigidly connected at its upper end 31. Lower ends 32, 33 of the front struts are pivotally connected to brackets 34, 35 which are clamped to a steering tube 36 that provides a bearing for handlebar stalk 37, and lower end 38 of the rear strut is rigidly connected to a pair of fork bracket plates 39 which carry the rear wheel 13. The front end of the front tie member 20 is also pivotally connected to the bracket 35, and rear end 40 of the rear tie member 21 is pivotally connected to the plates 39.

The column 18, which carries the saddle 17, passes through a sleeve-like bearing 41 pivotally mounted at 42 on the bracket 25. The column 18 is tubular and telescopically adjustable in length by means of a clamp 43, and a heavy compression spring 44 extends between the clamp and the bearing 41 to provide resilient suspension. The column 18 is also formed with a hinge 45 surrounded, in the in-use position, by a sleeve 46 which is urged upwardly by a light compression spring 47 as shown in FIG. 5.

Usual conventional accessories such as brakes 48, a multi-speed gear, a chain-(wheel) guard, lamps and carrier (not shown), may be provided, and a chain guide 49 mounted on the bearing unit 24 and a chain shield 50 are also provided.

Figure 5:
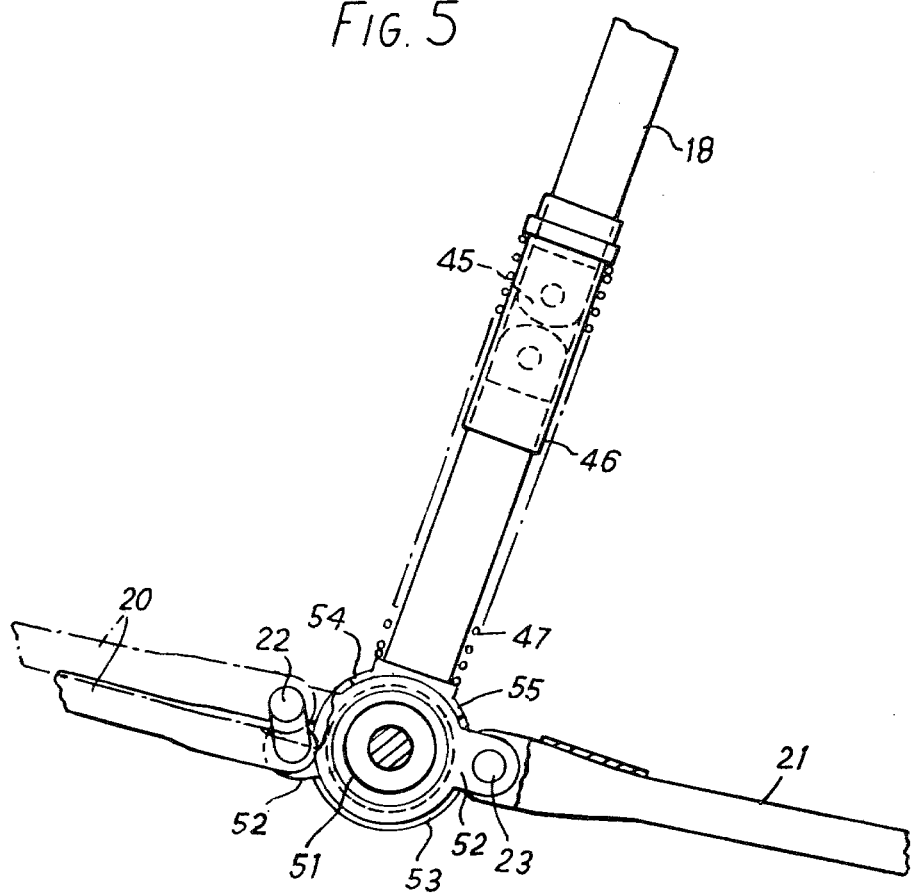
FIG. 5 is a detail side view showing a bearing unit of the bicycle frame.

As is also shown in FIG. 5, the bearing unit 24 comprises a pedal bearing 51 to which side plates 52 are secured and around which sleeve bearing 53 for the column 18 is mounted. The bearing 53 is pivotal to facilitate folding of the frame, but limited in this movement by abutments 54, 55 which engage the roots of the side plates to prevent jamming of the tie members 20, 21 during folding.

The plates 52 carry the pivots for the inner ends of the tie members 20, 21, and it will be noted that the pivotal axis (at 22) of the front tie member 20 is canted, as are the pivotal axes at 29, 30, 33, so that the front wheel will shift laterally and lie alongside the rear wheel 13 in the folded position of the bicycle. The axle of wheel 11 is arranged to lie below the axle of wheel 13, to minimise the lateral dimensions of the folded bicycle; to this end also, the pedals 14 may be arranged to fold flat against their crank arms 14A, and the saddle 17 is mounted on the column 18 by means of a releasable pivot 56 having a fore-and-aft axis.

Referring to FIGS. 6, 7 and 8, the handlebars 12 comprise two hand-grip parts 57 formed as L-shaped tubular members carried in tubes 58 which are secured to a clamping sleeve 59 on the stalk 37 by upper and lower plates 60. The parts 57 are locked in position by means of a transverse metal bar 61 which is carried on a rod 62. In the in-use position shown in FIGS. 6 to 8, the bar enters recesses 63 in the parts 57, but can be depressed by pressing on knob 64 to move the rod 62 downwards against the action of spring 65. The handlebars can then be swivelled to their stowed positions (shown in broken lines) where they can be locked by releasing the knob 64 and so allowing the bar to enter alternative recesses 66. This locking arrangement may be mechanically inverted to fail safe.

When the bicycle is to be folded, from the position shown in FIG. 1 to the position shown in FIGS. 3 and 4, the procedure illustrated in FIGS. 2a to 2g is followed. The procedure involves the following steps:

(a) The bicycle is in the in-use position (FIG. 2a).

(b) The handlebars 12, with the front wheel 11, are rotated through 180°, and the knob 64 is depressed and the hand grip parts 57 are swivelled towards one another and locked in their folded positions by releasing the knob (FIG. 2b).

(c) By grasping the saddle 17 or the upper end of the support column 18, the column 18 is raised to cause the frame base 19 to fold about unit 24 (FIG. 2c).

(d) The column 18 is raised further to cause the wheels 11 and 13 to swing towards one another (FIG. 2d).

(e) The column 18 reaches its uppermost position, with the wheels alongside one another (FIG. 2e).

(f) In the uppermost position of the column 18, the sleeve 46 is displaced from around the hinge 45, having been arrested by bearing 41 at bracket 25, and the upper length of the column is then swung downwards, about the hinge 45 (FIG. 2f).

(g) Finally, the saddle 17 reaches a position adjacent the wheel 13 and is swung about its pivot 56, then released, to lie close alongside the wheel 13 (FIG. 2g).

During the above folding movements, the guide 49 moves with pedal bearing 51 and takes up slack in the chain 16 and, in the folded position shown in FIGS. 2g, 3 and 4, the shield 50 steadies the chain and shields the chain against contact with the user.

As illustrated, the various parts of the bicycle are formed of metal, the frame being essentially of tubular steel. However, the frame and also various other parts of the bicycle may be formed of structural plastics material, possibly in box-sections, which has the advantages of lightness, less noise in folding and unfolding, and surfaces which are less likely to scrape.

It will be appreciated that, in the in-use position, the weight of the rider will minimise any danger of the frame folding unintentionally. It will also be appreciated that the bicycle can be collapsed quickly and simply, with the single principal operation of lifting the saddle, to a folded position in which it is relatively easy to carry and stow. It is useful to incorporate a spring-loaded catch pin in at least the front hand-brake, so that the front wheel can be braked to stabilise the bicycle during the folding operation and also during an unfolding operation.

Other modifications may also be made without departing from the scope of the invention. For example, as an alternative to canted axes (at 22, 29, 30, 33) the wheels may be mounted on stub shafts extending in opposite lateral directions.

I claim:

1. In a folding bicycle comprising a frame, a front wheel and handlebars at the front end of the frame, a rear wheel at the rear end of the frame, and a saddle carried at an intermediate part of the frame, the improvement wherein said frame comprises a base including generally-aligned end-to-end tie members having adjacent ends and remote ends, a bearing unit to which said tie members are pivotally connected at their adjacent ends, an apex joint having a bearing opening, strut members connected between said apex joint and the remote ends of the tie members, and a support member, which extends from said bearing unit to which it is secured and slidably through said bearing opening in the apex joint to carry said saddle, said frame being collapsible on raising said support member to move said bearing unit towards said apex joint and so swing the front and rear wheels downwardly into positions alongside one another.

2. A folding bicycle as claimed in claim 1, in which selected pivotal axes of said tie and strut members are canted to swing said wheels closely alongside one another in the folded position of the bicycle.

3. A folding bicycle as claimed in claim 1 or claim 2, in which a hinge is incorporated in said support member so that, when fully raised, a major length of the support member is swingable downwardly to position said saddle adjacent said wheels.

4. A folding bicycle as claimed in claim 3, in which a locking member is spring-urged to immobilise said hinge, the locking member being actuated by said apex joint as said bearing unit nears the apex joint to free the hinge.

5. A folding bicycle as claimed in claim 1 or claim 2, in which swivel joints are incorporated in said handlebars to permit the handlebars to be swung to folded positions.

6. A folding bicycle as claimed in claim 5, in which said handlebars comprise a pair of hand-grip members having selected recesses, and spring-loaded means to engage said selected recesses and lock the hand-grip members in alternative in-use and folded positions.

7. A folding bicycle as claimed in claim 1 or claim 2, in which said saddle is pivotally mounted on a fore-and-aft axis, to permit the saddle to lie close alongside said wheels in the folded position of the bicycle.

8. A folding bicycle as claimed in claim 1 or claim 2, further comprising a bearing tube for said handlebars and support bracket means for said rear wheel, and in which said strut members have upper and lower ends and comprise a front pair of struts pivotally connected at their upper ends to said apex joint and having pivotal connections at their lower ends with said bearing tube, and a rear strut which extends between the apex joint and said support bracket means, said front tie member having a pivotal connection with the bearing tube and said rear tie member being pivotally connected to the support bracket means.

9. A folding bicycle as claimed in claim 1 or claim 2, in which a chain guide is mounted on said bearing unit to move with the bearing unit and take up chain slack during folding of the bicycle.

10. A folding bicycle as claimed in claim 1 or claim 2, and further comprising a handbrake catch to permit automatic locking of at least one of said wheels during folding and unfolding of the bicycle.

11. A folding bicycle as claimed in claim 1 or claim 2, in which abutment means are carried by said support member above said apex joint, and compression spring means extend between said abutment means and said apex joint to provide resilient mounting of said saddle.

12. A folding bicycle as claimed in claim 11, in which said support member comprises telescopic parts, and said abutment means comprises an annular clamp which is engaged by said spring means, and which locks said telescopic parts in selected positions to provide height-adjustment for said saddle.

* * * * *